(12) United States Patent
Gulwani et al.

(10) Patent No.: US 8,484,550 B2
(45) Date of Patent: Jul. 9, 2013

(54) AUTOMATED TABLE TRANSFORMATIONS FROM EXAMPLES

(75) Inventors: Sumit Gulwani, Redmond, WA (US); William Robert Harris, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 93 days.

(21) Appl. No.: 13/014,734

(22) Filed: Jan. 27, 2011

(65) Prior Publication Data
US 2012/0198322 A1    Aug. 2, 2012

(51) Int. Cl.
*G06F 3/00* (2006.01)

(52) U.S. Cl.
USPC ........................................................ 715/217

(58) Field of Classification Search
USPC .................. 715/217, 234, 243, 254, 255
See application file for complete search history.

(56) References Cited

U.S. PATENT DOCUMENTS

| | | | |
|---|---|---|---|
| 7,143,026 | B2 | 11/2006 | Challenger et al. |
| 7,493,392 | B1 * | 2/2009 | Gangadharan et al. ....... 709/225 |
| 2005/0228728 | A1 * | 10/2005 | Stromquist ..................... 705/30 |
| 2006/0007466 | A1 | 1/2006 | Ben-Yehuda et al. |
| 2008/0208830 | A1 | 8/2008 | Lauckhart et al. |
| 2010/0083092 | A1 * | 4/2010 | Schuller et al. ............... 715/227 |

OTHER PUBLICATIONS

Metter, et al., "WAP enabling existing HTML applications", Retrieved at << http://ce.sejong.ac.kr/~dshin/Papers/WAP/00822065.pdf >>, First Australasian User Interface Conference, AUIC, 2000, pp. 49-57.
Pivk, et al., "From Tables to Frames", Retrieved at << http://citeseerx.ist.psu.edu/viewdocklownload? doi=10.1.1.73.1687&rep=rep1&type=pdf >>, Jul. 19, 2004, pp. 1-17.
Pivk, et al., "Transforming Arbitrary Tables into F-Logic Frames with TARTAR", Retrieved at << http://citeseerx.ist.psu.edu/viewdoc/download?doi=10.1.1.59.9533&rep=rep1&type=pdf >>, Data & Knowledge Engineering, Aug. 4, 2005, pp. 1-44.
"Adobe ® InDesign", Retrieved at << http://www.adobe.com/products/indesign/pdfs/id2layoutdesign.pdf >>, Version 2.0, pp. 1-12, 2002.
Chen, et al., "Mining Tables from Large Scale HTML Texts", Retrieved at <<http://acl.ldc.upenn.edu/C/C00/C00-1025.pdf >>, 2000, pp. 166-172.
Barbosa, et al., "Matching Lenses: Alignment and View Update", Retrieved at <<http://www.cis.upenn.edu/~bcpierce/papers/alignment.pdf, In ICFP '10. Sep. 2010, pp. 1-12.
Sarma, et al., "Synthesizing View Definitions from Data", Retrieved at <<http://ilpubs.stanford.edu:8090/941/2/views-TR.pdf>>, In ICDT '10. Mar. 2010, pp. 1-15.

(Continued)

*Primary Examiner* — Kyle Stork

(57) ABSTRACT

Described herein are mechanisms for automatically generating a computer-executable program that transforms a first table in a first format to a second table in a second format by way of user-provided examples. A user provides an exemplary input table of a first format, where the input table may be a portion of the first table. The user also provides an exemplary output table of a second format, wherein contents of the output table correspond to contents of the input table. Based upon these user-provided examples, a table transform program is automatically generated, wherein the table transform program, when executed over the first table generates the second table.

20 Claims, 9 Drawing Sheets

OTHER PUBLICATIONS

Fisher, et al., "From Dirt to Shovels: Fully Automatic Tool Generation From Ad Hoc Data", Retrieved at <<http://www.cs.princeton.edu/~kzhu/papers/learningpopl08.pdf>>, In POPL '08. Jan. 2008, pp. 1-12.

Gulwani, "Automating String Processing in Spreadsheets Using Input-Output Examples", Retrieved at <<http://research.microsoft.com/en-us/um/people/sumitg/pubs/popl11-synthesis.pdf>>, Retrieval Date: Jan. 25, 2011, pp. 1-13.

Jha, et al., "Oracle-Guided Component-Based Program Synthesis", Retrieved at <<http://research.microsoft.com/en-us/um/people/sumitg/pubs/icse10_synthesis.pdf>>, In ICSE '10, May 2010, pp. 1-10.

Lau, et al., "Programming by Demonstration Using Version Space Algebra", Retrieved at <<http://www.cs.washington.edu/homes/weld/papers/mlj02.pdf>>, Machine Learning, vol. 53, Issue 1-2, Nov. 2003. pp. 1-60.

Lau, et al., "Version Space Algebra and its Application to Programming by Demonstration", Retrieved at <<http://www.cs.washington.edu/homes/pedrod/papers/mlc00c.pdf>>, In ICML '00, 2000, pp. 1-8.

Solar-Lezama, et al., "Sketching Stencils", Retrieved at <<http://www.cs.berkeley.edu/~bodik/research/pldi07-sketching-stencils.pdf>>, In PLDI '07, Jun. 2007, pp. 1-12.

Tran, et al., "Query by Output", Retrieved at <<http://dl.comp.nus.edu.sg/dspace/bitstream/1900.100/2938/1/TRA4-09.pdf>>, In SIGMOD 2009, 2009, pp. 1-39.

* cited by examiner

AUTOMATED TABLE TRANSFORMATIONS FROM EXAMPLES

BACKGROUND

Tables have historically been utilized to arrange data in a suitable manner for review or computer processing. For example, spreadsheet applications have been developed to arrange and process data in tabular form. Additionally, many current word processing applications have table functionality associated therewith such that a user can display data in a certain format through utilization of one or more tables. Additionally, many databases can be thought of as tables, wherein entries in a database are arranged by certain indices.

In some instances, a user of one of these applications may wish to generate a new table from an existing table, wherein the new table includes some of the same data that is in the existing table (or data that can be derived from such data), but is arranged in a different format. There are substantially an infinite number of formats in which data can be displayed in a table and, depending upon a current task of a user, the user may wish to alter the format to transform the existing table into the new table such that the new table corresponds to a format that is desired by the user.

Currently, it is relatively difficult for an individual to perform format modifications on tables, particularly on tables that include a relatively large amount of data. Some conventional spreadsheet applications provide support for user-generation and implementation of one or more algorithms that can execute over an input table to create an output table. Most computer users, however, are not skilled in computer programming, and most users find spreadsheet application supported languages for generation of computer-executable programs to be non-intuitive. Thus, oftentimes a user will take a relatively long amount of time to manually recreate or reorganize data in an existing table to generate a new table in a format that is desired by the user. Manual creation of a new table from an existing table can allow for the user to make various mistakes when transferring data between tables. Also, the task of manually creating a new table from an existing table can be relatively menial, oftentimes boring for the user. Alternatively, a novice computer user can hire an expert programmer to generate a program or a script that can create a new table from an existing table with the format desired by the user, but hiring such programmer can be expensive.

SUMMARY

The following is a brief summary of subject matter that is described in greater detail herein. This summary is not intended to be limiting as to the scope of the claims. Described herein are various technologies pertaining to transforming a first table in a first format to a second table in a second format through utilization of examples. For instance, a user may have a relatively large table with many cells, wherein at least a subset of the cells have data retained therein, and wherein the table has a first format. The first format can be defined by a number of rows or columns in the first table, the arrangement of data into the rows and columns of the table, etc. The user may desire to transform this first table into a second table with a second format, wherein the second format is different than the first format. For instance, the second format may have a different number of rows and/or columns. Alternatively, the second format may have the same number of rows and columns but the arrangement of data in such rows or columns may be different. Rather than manually creating this second table from data in the first table, the user can select a portion of the first table, which can be hereinafter referred to as an input table. For instance, this input table may be a particular number of rows and/or a particular number of columns in the first table. The user may then provide a corresponding exemplary output table. The output table can be a table that corresponds to the exemplary input table provided by the user, but is in the second format. In other words, the output table is a manually created portion of a desired second table in the second format.

Based at least in part upon the exemplary input table and the exemplary output table provided by the user, a computer executable program can be automatically generated, wherein the computer executable program, when applied to the exemplary input table generates the exemplary output table. Once such computer executable program has been generated, this computer executable program can be executed over the first table described above, wherein the first table comprises a relatively large amount of data. Subsequently, the second table that is in the second format that is desired by the user can be automatically output through utilization of the computer executable program.

In accordance with an exemplary embodiment described in greater detail herein, the computer executable program can be inferred in a plurality of steps. First, the exemplary input table and the exemplary output table can be analyzed, and a candidate map between at least a portion of the exemplary input table and a portion of the exemplary output table can be generated. For instance, data that co-occurs between cells of the input table and cells of the output table can be located and a candidate map between cell positions in the input table and cell positions in the output table can be generated. Based at least in part upon such candidate map, a filter program can be inferred. The filter program can comprise one or more predefined rules that must be satisfied between the input table and the output table. These predefined rules can be generated based upon empirically collected data regarding table transformations commonly undertaken by users of certain types of applications, such as spreadsheet applications, word processing applications, database applications, etc. The filter program can also comprise a sequence program (sequencer) that indicates a sequence corresponding to cell positions in the exemplary output table. Again, this sequencer can be selected from amongst a plurality of predefined sequencers.

Once a filter program has been inferred, such filter program can be utilized to build an associative program. For example, the filter program may be configured to generate a certain portion of the exemplary output table based upon a certain portion of the exemplary input table. Such filter program, however, may not be able to perform the entire transformation between the exemplary input table and the exemplary output table. Accordingly, such filter program can be utilized to generate an associative program that is configured to associate the filter program with another portion of the exemplary output table. The resulting associative program, then, can be utilized to generate another portion of the exemplary output table from another portion of the exemplary input table. The associative program comprises the filter program, and two relative functions, wherein the relative functions can be chosen from amongst a plurality of predefined relative functions.

While examples described above have mentioned a spreadsheet application as being an application that can perform transformation of tables from a first format to second format, it is to be understood that such transformation can be undertaken in other applications as well, such as word processing applications, database applications, etc. Furthermore, cross application transformation of tables is also contemplated. For instance, a user may have a first table that is in a word processing application and may wish to transform that first table into a second table in a spreadsheet application. Such cross application table transformations through utilization of examples is contemplated by the inventors and is intended to fall under the scope of the hereto appended claims.

Other aspects will be appreciated upon reading and understanding the attached Figs. and description.

DETAILED DESCRIPTION

Figure 1:
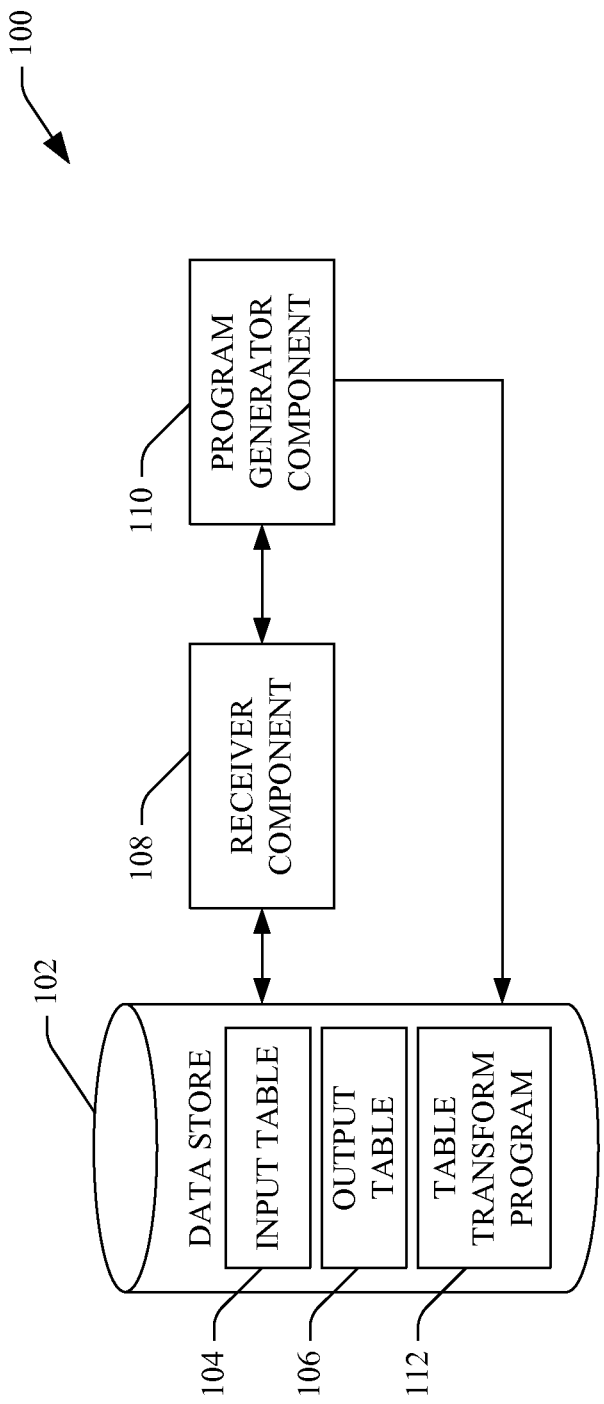
FIG. 1 is a functional block diagram of an exemplary system that facilitates automatically generating a computer executable program that can be employed to transform a first table in a first format to a second table in a second format.

Various technologies pertaining to transforming a first table in a first format to a second table in a second format through utilization of user-provided examples will now be described with reference to the drawings, where like reference numerals represent like elements throughout. In addition, several functional block diagrams of exemplary systems are illustrated and described herein for purposes of explanation. However, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

With reference now to FIG. 1, an exemplary system 100 that facilitates automatically transforming a first table in a first format to a second table in a second format is illustrated. The system 100 includes a data store 102, wherein the data store 102, for instance, may be a particular portion of memory that is allocated to a certain application. The application may be a word processing application, a spreadsheet application, a database application, or the like. The data store 102 comprises an input table 104 and output table 106. The input table 104, for instance, may be in a first format. As used herein, the term format can indicate a manner in which data is arranged in cells of a table. Thus, the first format may have a particular number of rows, a particular number of columns, and/or a particular manner in which data is arranged in the table. Pursuant to an example, the input table 104 may be a portion of a first table that has the first format. Thus, the input table 104 may be an exemplary table that is selected from a larger table (the first table) by the user.

The output table 106 may be a manually generated table that corresponds to the input table, but is in a second format. Specifically, a user may wish to transform the first table into a second table of the second format, and the system 100 facilitates this transformation through utilization of example tables provided by the user. Accordingly, the output table 106 is an exemplary sub-table (portion) of what will be a larger table (in the second format), wherein the exemplary output table 106 corresponds to the exemplary input table 104.

The system 100 additionally includes a receiver component 108 that can access the data store 102 and receive the input table 104 and the output table 106. A program generator component 110 is in communication with the receiver component 108 and can automatically generate a computer-executable program that, when executed over the input table 104, transforms the input table 104 into the output table 106 (e.g., generates the output table 106). Such a computer executable program that performs this transformation when executed over the input table can be referred to herein as a table transform program 112, which can be retained in the data store 102.

Since the table transform program 112 generates the output table 106 of the second format based upon the input table 104 of the first format, the table transform program 112 can be applied to other tables of the first format to generate corresponding tables of the second format. As mentioned previously, the input table 104 can be a sub-table of a larger table (a first table). Accordingly, the table transform program 112 can be executed over the first table to generate a corresponding second table of the second format (of the same format as the user provided output table 106). Thus, the system 100 facilitates transformation of a relatively large first table of a first format into another relatively large second table of the second format by way of user provided examples of a smaller table (the input table 104) in the first format and a smaller table (the output table 106) in the second format. This approach is intuitive to relatively novice computer users that are not skilled in computer programming, as this approach allows the user to inform a computer that the user wishes a table transformation to be performed without requiring the user to inform the computer of exactly how to perform such a table transformation.

In one exemplary aspect, the input table 104 and/or the output table 106 can be formatted in accordance with a spreadsheet application, such that the tables appear in cells, rows and columns in the spreadsheet application. It is to be understood, however, that one or more of the input table 104 or the output table 106 may be in the form of structured text, wherein certain delimiters such as spaces, semicolons, etc. can indicate the format of the input table 104 or the output table 106 (e.g., the delimiters can indicate cell positions in a table). Moreover, the system 100 facilitates cross-application table transformation. Accordingly, the input table 104 provided by the user may be from a word processing application, while the output table 106 may desirably be placed in a spreadsheet application. Additionally or alternatively, one or more of the input table 104 or the output table 106 may be from a database application, such that a user can convert formatting/view of a table in a database management system through utilization of the system 100.

In an exemplary embodiment, a general purpose computing device such as a desktop computer, a laptop computer, a mobile computing apparatus such as a mobile telephone, personal digital assistant, multimedia player, etc. may comprise the system 100. The user may utilize the graphical user interface of one or more applications to select a sub table from the first table of the first format as the input table 104, and, for instance, use mechanisms such as click and drag, drop down menus, etc. to initiate transformation of the first table to a second table of the second format through utilization of the table transform program 112. In another exemplary embodiment, a server may comprise the system 100, wherein an application that utilizes the system 100 is accessible to the user by way of an Internet browser. That is, remotely hosted applications can utilize aspects of the system 100 that have been described herein.

Figure 2:
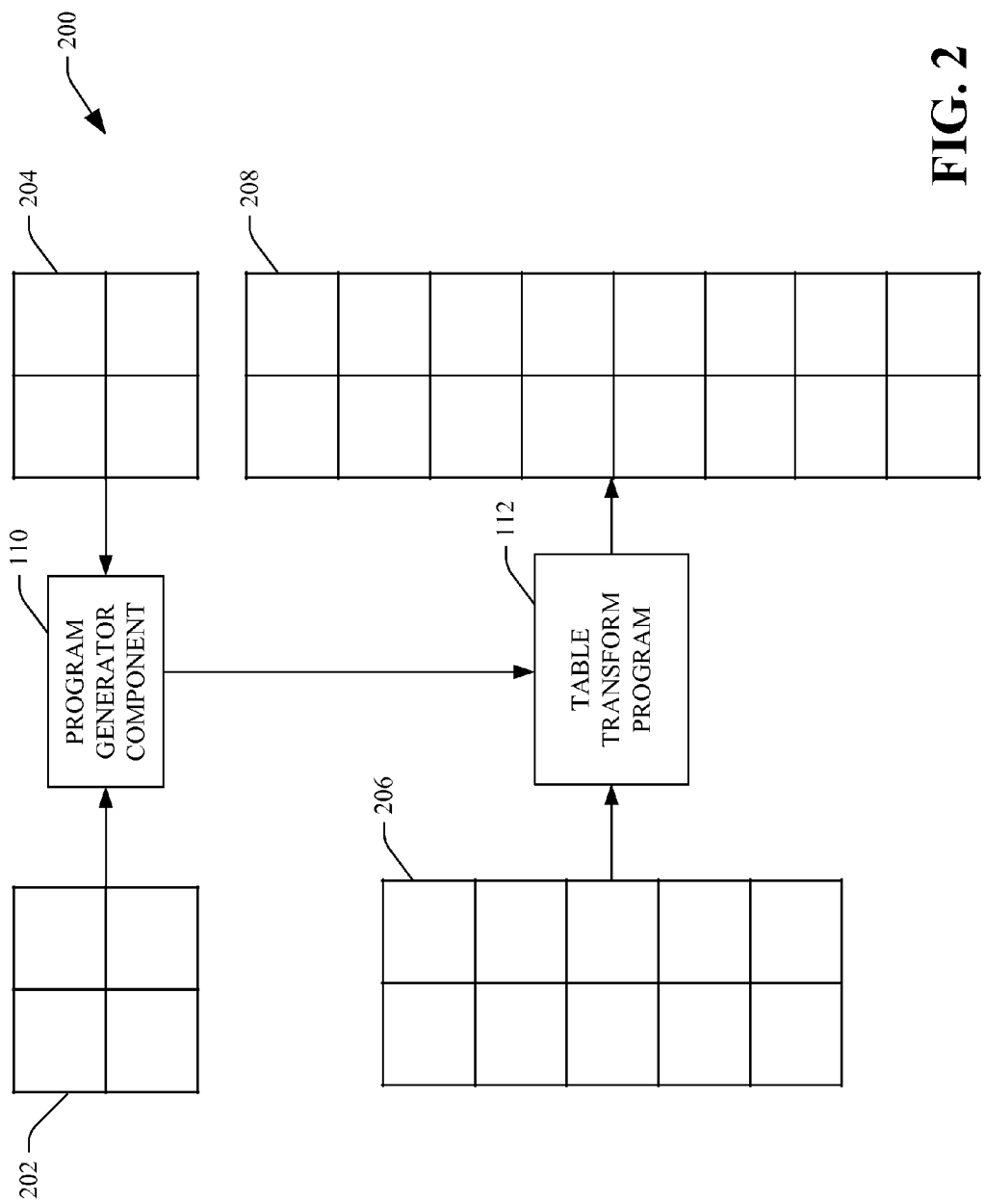
FIG. 2 is an exemplary depiction of a transformation of a first table in a first format to a second table in a second format based at least in part upon user-provided examples.

Turning now to FIG. 2, an exemplary depiction 200 of generation of an exemplary table transform program is illustrated. FIG. 2 illustrates an exemplary input table 202 and an exemplary output table 204. The exemplary input table 202 may be a portion of a larger table 206 (a first table) that has a format that is the same as the format of the input table 202 (a first format). The output table 204 corresponds to the input table 202, but is in a different format than the input table 202 (a second table). For example, data in cells in the output table 204 can include at least some data that is included in cells of the input table 202. In another example, data in cells in the output table 204 can be a function of data in cells of the input table 202. As described above, the input table 202 and the output table 204 are examples provided by a user, wherein such examples are desirably used to generate a table program that transforms the first table 206 into a table that has the same format as the output table 204 provided by the user as an example.

The program generator component 110 receives the input table 202 in the first format and the output table 204 in the second format. Responsive to receiving the tables 202 and 204, the program generator component 110 outputs the table transform program 112. Thereafter, the table transform program 112 receives the first table 206 as an input, wherein the table 206 has the first format. The table transform program 112, when executed over the first table 206, outputs a second table 208 that is in the second format (the same format as the exemplary output table 204 provided by the user). Accordingly, the user can cause a relatively large table to be transformed into another format relatively easily by providing examples indicating the format of the first table 206 and the desired format of the second table 208.

Figure 3:
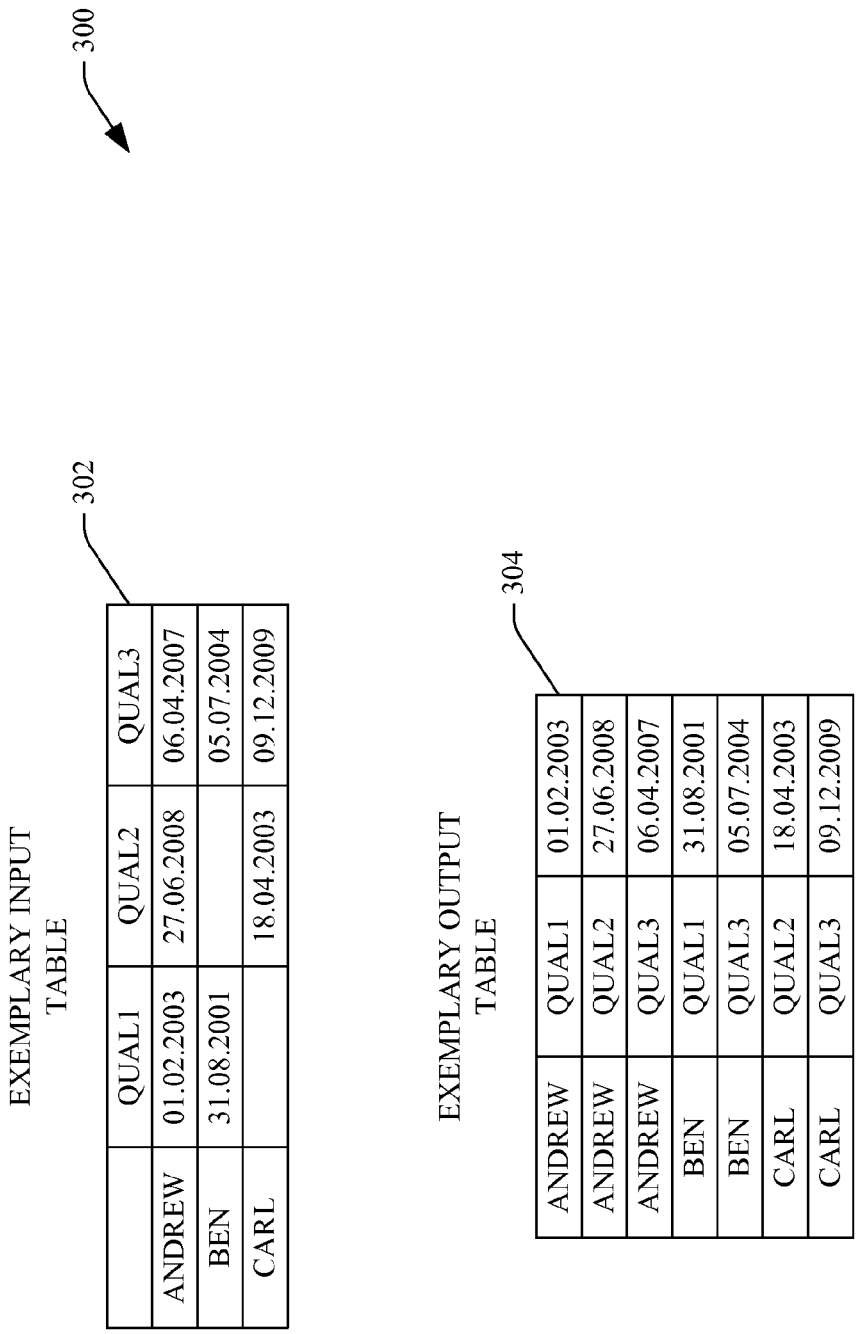
FIG. 3 illustrates an exemplary input table and an exemplary output table utilized in connection with generating a computer executable program that can transform a table in a first format to a table in a second format.

With reference now to FIG. 3, an illustration 300 of an exemplary input table 302 and an exemplary output table 304 is provided. The exemplary input table 302 is in a first format. That is, exemplary input table 302 comprises four rows and four columns. The first column of the exemplary input table 302 comprises names of individuals that took particular tests. The first row of the exemplary input table 302 indicates names of the particular tests (QUAL1, QUAL2, QUAL3). The remaining cells of the exemplary input table 302, if not empty, indicate dates that individuals in the first column of the exemplary input table 302 took the tests indicated in the first row of the exemplary input table 302.

The exemplary output table 304 includes three columns and seven rows. It can be ascertained that for every date in the exemplary input table 302, a row was created in the exemplary output table 304, wherein a row in the output table 304 includes the name of the test taker, the name of the test taken by the test taker, and the date on which the test was taken. If a cell in the exemplary input table 302 is empty, then no corresponding row is to be produced in the exemplary output table 304. Furthermore, it can be ascertained that the dates in the exemplary output table 304 are ordered by row-major order.

The program generator component 110 can receive the exemplary input table 302 and the exemplary output table 304 and can automatically generate a computer-executable program that can cause the input table 302 to be transformed into the output table 304. In addition, such computer-executable program can be utilized to transform a larger table (first table) that is in the same format as the exemplary input table 302 to a corresponding table (second table) that is in the same format as the exemplary output table 304. The exemplary input and output tables 302 and 304 shown in FIG. 3 will be utilized herein in connection with explaining operations of the program generator component 110 when producing a table transform program.

Figure 4:
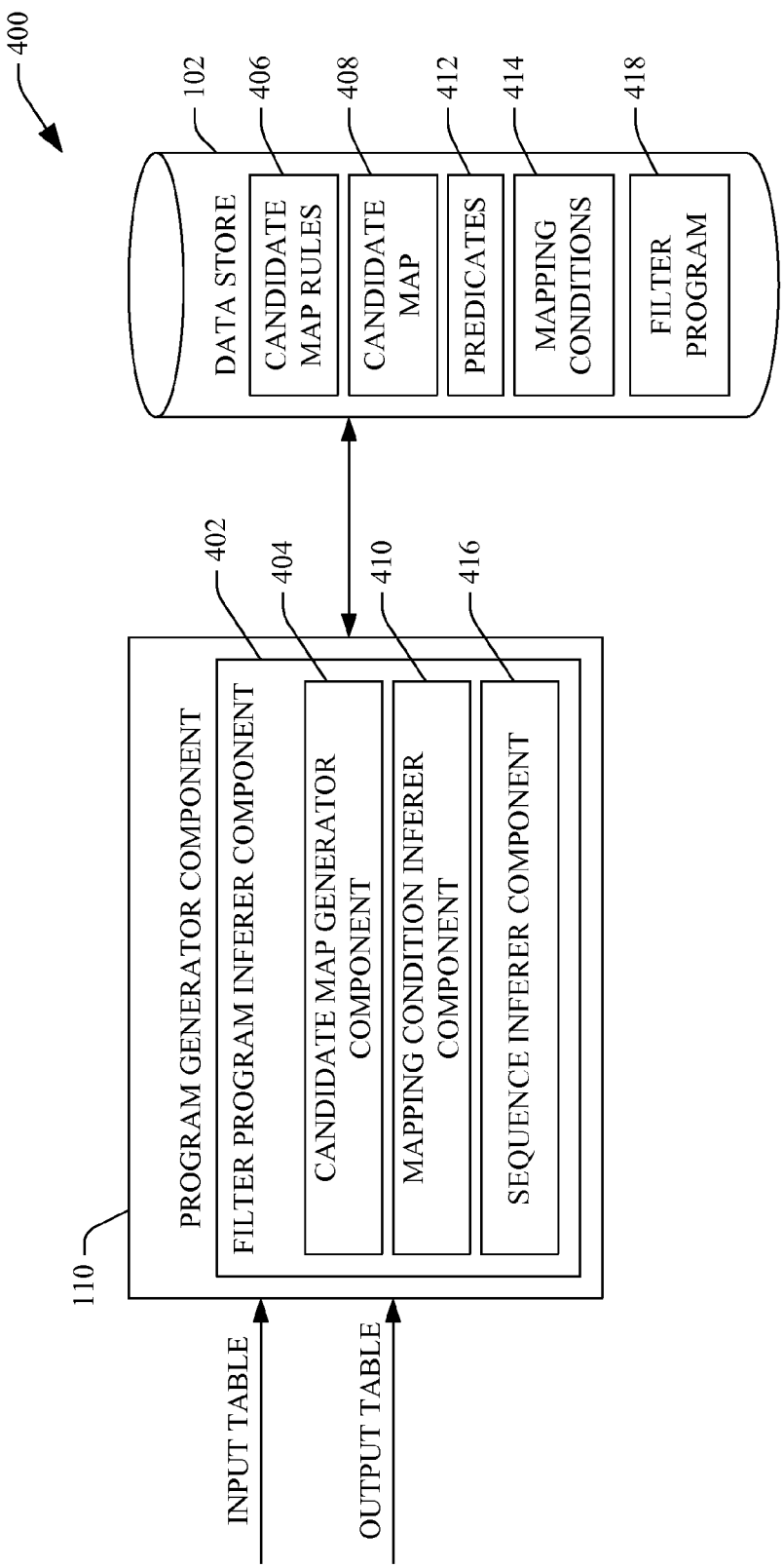
FIG. 4 is a functional block diagram of an exemplary system that facilitates generating a filter program that can be utilized in connection with transforming a table in a first format to a second table in a second format.

Referring now to FIG. 4, an exemplary system 400 that facilitates automatically generating the table transform program 112 is illustrated. In an exemplary embodiment, the table transform program 112 can be inferred in two steps: 1) a first step of building what is to be referred to herein as "component programs", which include "filter programs" and "associative programs", and a second step where "associative programs" are built from the "component programs." The building of a filter program is described in connection with FIG. 4. Additionally, for purposes of explanation, the building of such filter program is provided in connection with the exemplary input table 302 and the exemplary output table 304 depicted in FIG. 3. It is to be understood, however, that the exemplary tables depicted in FIG. 3 are presented for purposes of explanation only, and are not intended to be limiting as to the scope of hereto-appended claims.

The system 400 comprises the data store 102. Again, in an example, the data store 102 may be a particular portion of computer memory that is allocated to an application executing on a computing device. The system 400 further comprises the program generator component 110, which has access to the data store 102. That is the program generator component 110 can read from and write to the data store 102.

The program generator component 110 can receive the input table 104 and the output table 106, which are examples provided by the user in connection with generating the table transform program 112. The program generator component 110 can include a filter program inferer component 402. The input table and the output table can be referred to herein as $T_i$ and $T_o$ respectively. The filter program inferer component 402 is configured to infer a filter program based at least in part upon the exemplary input table 104 and the exemplary output table 106. A filter program can be defined herein as a computer executable program that undertakes a pass in some specified order (e.g., row major order) over the exemplary input table 104, selects entries in certain cells of the input table 104, and maps such cells to particular cell positions in the exemplary output table 106. In some instances, this can be accomplished by requiring that the data in cells of the input table 104 be identical to data in the cells of the output table 106. It is to be understood, however, that in some scenarios it may be desirable to consider data in the cells of the output table as some function of data in the cells of the input table 102, such as summations over certain cells in the input table 102, multiplications of data in the input cells 102, amongst other operations.

To infer a filter program, the filter program inferer component 402 may comprise a candidate map generator component 404 that is configured to generate a candidate map between cell positions in the input table 104 and cell positions in the output table 106. The data store 102 comprises candidate map rules 406 that are accessible to the candidate map generator component 404 and utilized by the candidate map generator component 404 to generate a candidate map 408 between at least a portion of the input table 104 and at least a portion of the output table 106. The candidate map 408, then, is a map between at least some cell positions in the input table 104 and at least some cell positions of the output table 106. The candidate map rules 406 can be a fixed set of candidate map rules that are created based upon known transformation patterns between input tables and output tables. Each candidate map rule in the candidate map rules 406 may produce a set of consistent maps between cell positions (coordinates) in the input table 104 and the output table 106. A map can be defined as consistent for an exemplary input table and an exemplary output table if, when applied to the exemplary input table, the map produces a substructure of the output table 106. Thus, the candidate map generator component 404 can apply the candidate map rules 406 in the data store 102 to the input table and can compare the resulting mapping to the output table to determine if any maps generated by way of the candidate map rules 406 creates a consistent map. A consistent map can be retained in the data store as the candidate map 408.

The candidate map 408 can satisfy several conditions. These conditions can include a condition that the candidate map 408 maps input coordinates (cell positions in the input table 104) to output coordinates (cell positions in the output table 106) with corresponding data. In an example, corresponding data can be equivalent data between data in the cell positions in the input table and cell positions in the output table. In another example, corresponding data can require that data in cell positions in the output table is a function of data in cell positions in the input table. This function can be inferred or can be explicitly provided by the user. For instance, if certain data in the output table is a summation of certain data in the input table, then the user can explicitly indicate that such a summation is undertaken.

Another condition corresponding to the candidate map 408 can be that the sequence of coordinates in the output table is described by a predefined output sequencer. That is, the candidate map 408 can map to every coordinate in the output table 106 at or below row i and between columns j and k of the output table 106 for some i, j and k.

Yet another condition that must be satisfied by the candidate map 408 can be that the candidate map 408 maintains some order, such as row major order. That is, a sequence of coordinate pairs in the candidate map 408 ordered by row major ordering of the input coordinates can be equal to the sequence of entries ordered by the row major ordering of the output coordinates.

The filter program inferer component 402 can infer a filter program based at least in part upon the candidate map 408. The filter program inferer component 402 comprises a mapping condition inferer component 410 to infer one or more mapping conditions that is to be satisfied by a filter program output by the filter program inferer component 402. With more detail, the data store 102 can comprise a plurality of predicates 412. These predicates 412 can be a fixed set of atomic predicates 412 that are generated based at least in part upon observed table transformations desired by users of various computing applications, such as word processing applications, spreadsheet applications, etc. Each atomic predicate in the predicates 412 describes some feature of a cell. In an example, the mapping condition inferer component 410 can infer one or more mapping conditions 414 that are to be are to be included in a resulting filter program.

To infer a filter program that computes the candidate map 408, the filter program and infer component 402 can also infer an output sequencer for the filter program. The filter program inferer component 402 includes a sequence inferer component 416 that infers an output sequencer (from amongst a predefined list of output sequencers) by ordering coordinates in the output table by the order in which the resulting filter program must map such coordinates. For instance, such coordinates may be desirably mapped by the row major ordering of cells in the input table 104 that map to such cells. The sequence inferer component 416 may then check if the ordered sequence of output coordinates matches the output coordinates described by some output sequencer from some fixed set of sequencers. If so, then the sequence inferer component 416 can select the matching sequencer. The filter program infer component 402 may then infer a filter program 418 and cause such filter program 418 to be retained in the data store 102, wherein the filter program 418 is the one or more mapping conditions 414 together with the sequencer inferred by the sequence inferer component 416. The resulting filter program 418 can scan over input coordinates of the input table 104, determine if cells in the input table meet the mapping condition 414, and sequence cells that meet the mapping condition in a sequence dictated by the sequencer inferred by the sequence infer component 416.

Execution of the filter program infer component 402 in connection with the exemplary input table 302 and the exemplary output table 304 shown in FIG. 3, is now described. For instance, an exemplary candidate map rule 406 can indicate that a coordinate in the input table 104 is to be mapped to a coordinate in column k of the output table 106, if and only if the values of cells at those coordinates are equal. This rule can be applied for each column k in the exemplary output table 304. The rule for k=3 can generate a candidate map from each coordinate holding a date in the input table 302 to the coordinate in the output table 304 holding the same date. This map $m_F$, which is a candidate map between the input table 302 and the output table 304, is shown below:

$$m_F = \left\{ \begin{array}{c} ((2, 2), (1, 3)), ((2, 3), (2, 3)), ((2, 4), (3, 3)), \\ ((3, 2), (4, 3)), ((3, 4), (5, 3)), \\ ((4, 3), (6, 3)), ((4, 4), (7, 3)) \end{array} \right\}$$

The mapping condition infer component 410 can access the candidate map 408 and utilize a greedy algorithm to locate one or more atomic predicates 412 to infer one or more mapping conditions 414. A mapping condition inferred by the mapping condition inferer component 410 must be satisfied by every input cell mapped by the candidate map 408 and must not be satisfied by any input cell that is not mapped by the candidate map 408. Exemplary predicates that can be utilized by the mapping condition inferer component 410 can include a predicate that decides if a cell is in row one, a predicate that decides if a cell is empty, and for each column k in the example input table, a predicate that decides if a cell is in column k. Given such predicates, the mapping condition inferer component 410 can infer a conjunctive mapping predicate, which can be as follows: each cell in the input table 302 must not be in row one, must not be in column 1, and must not be empty.

Once the one or more mapping conditions are inferred, the sequence inferer component 416 can infer an output sequencer for the filter program 418 from a fixed set of sequencers. To infer a sequencer, the sequence inferer component 416 can order the output coordinates that are mapped to by the candidate map 408 by the row major order of the input cells. The output coordinates ordered in this way form column 3 of the exemplary output table 304. Accordingly, the filter program inferer component 402 builds the filter program 418 that computes the candidate map 408 from a sequencer that maps to coordinates in column 3 of the exemplary output table 304 as opposed to a sequencer that maps to coordinates in column 1 or two of the exemplary output table 304.

Figure 5:
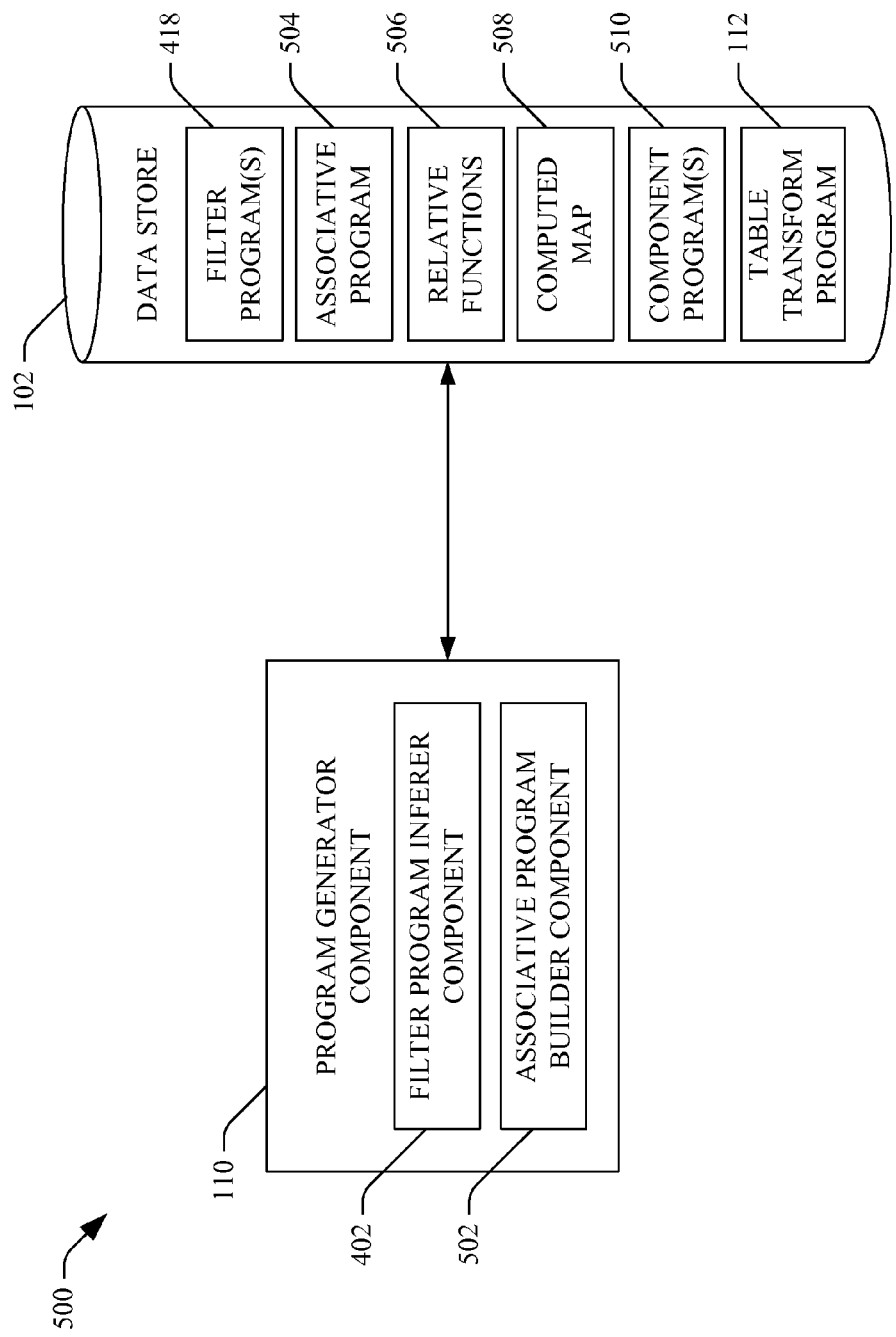
FIG. 5 is a functional block diagram of an exemplary system that facilitates automatically generating an associative program based at least in part upon a filter program.

With reference now to FIG. 5, an exemplary system 500 that facilitates generating the table transform program 112 is illustrated. The system 500 comprises the program generator component 110 that infers the table transform program 112 based at least in part upon an input table in a first format and output table in a second format provided by the user. As described above, the program generator component 110 includes a filter program inferer component 402 that generates the filter program 418 and causes the filter program 418 to be retained in the data store 102. The program generator component 110 additionally includes an associative program builder component 502 that utilizes the filter program 418 to generate an associate program. As indicated above, both a filter program and an associative program can be referred to herein as "component programs." As will be described in greater detail herein, the program generator component 110 can utilize the associative program builder component 502 to iteratively build component programs from other component programs until a set of component programs that map to all cells in the exemplary output table are located. Additional details pertaining to the associative program builder component 502 will now be provided.

The associative program builder component 502 can receive the filter program 418 inferred by the filter program inferer component 102. Based at least in part upon the filter program 418, the associative program builder component 502 can build an associative program 504 and cause such associative program 504 to be retained in the data store 102. The associative program 504, like the filter program 418, can map coordinates of cells in the input table 104 to coordinates of cells in the output table 106. The associate program builder component 502 builds the associative program utilizing the filter program 418 to compute a map between coordinates in the input table 104 and the output table 106 and then alters each pair of coordinates in the resulting map to produce a new map. The associative program 504 generated by the associative program builder component 502 can alter the map computed by the filter program 418 by applying a first relative function to each input coordinate to obtain new input coordinates and then applying another relative function to each output coordinate to obtain new output coordinates. Thus, the associative program 504 can be the two relative functions applied to the filter program 418.

With more specificity, the associate program builder component 502 can access the data store 102 and can analyze a plurality of predefined relative functions 506. Such relative functions can be fixed, and can be selected for inclusion from a fixed list based upon commonly observed or requested table transformations. Pursuant to an example, the associate program builder component 502 can greedily apply all relative functions 506 in the list to the filter program 418 to generate a plurality of associative programs (including the associative program 504). The associative program builder component 502 may then cause the associative program 504 to generate a computed map 508. The computed map 508 can be compared with output cells in the exemplary output table 106, and if the computed map 508 corresponds to the output cells, than the associative program 504 that was utilized to generate the computed map 508 can be retained as a component program 510 in the data store 102. If the associate program 504 fails to generate the computed map 508 that maps appropriately to the output cells of the exemplary output table 106, than the associative program 504 can be discarded.

Thereafter, the associate program builder 502 can receive the component program 510 as input, and can apply relative functions to the component program to create a new component program, and can cause the new component program to generate a new computed map. The new computed map may then be compared with cells in the exemplary output table 106, and if the new computed map is consistent (as defined above) and covers portions of the exemplary output table 106 that are not already covered by another map generated by another component program, then such new component program is retained. The program generator component 110 creates the table transform program 112 by collecting component programs that cover different portions of the output table 106 until the collection of component programs fully maps the exemplary input table 104 to the exemplary output table 106. The resulting table transform program 112 can be utilized to transform other tables that have the same format as the input table 104 to other tables that have the same format as the output table 106. For instance, the table transform program 112 can be retained as a template, such that the template can be utilized at a later point in time to transform another table of the first format to a table of the second format.

Referring back to the exemplary input table 302 and the exemplary output table 304 shown in FIG. 3, and the exemplary candidate map $m_F$ shown above, execution of the associative program builder component 502 will be described. An exemplary first associative program $A_1$ when applied to the candidate map $m_F$ can alter the input coordinates (the coordinates of the input table 302) of the candidate map $m_F$ by applying to each of such coordinates a relative function RELCOL$_1$ that computes the coordinate in the same row and column one of the input table 302. The associative program can also alter the output coordinates of the candidate map $m_F$ by applying a relative function RELCOL$_1$ to each output coordinate. The resulting map $m_{A1}$ generated from the relative functions being applied to $m_F$ maps coordinates in column one of the input table to coordinates of cells to be produced in column one of the output table as shown below:

$$m_{A1} = \left\{ \begin{array}{c} ((2, 1), (1, 1)), ((2, 1), (2, 1)), ((2, 1), (3, 1)), \\ ((3, 1), (4, 1)), ((3, 1), (5, 1)), \\ ((4, 1), (6, 1)), ((4, 1), (7, 1)) \end{array} \right\}$$

A second associative program $A_2$, for instance, can map some portion of the input table to all cells that will be in column two of the output table 304. Like the first associate program $A_1$ described above, the second associative program $A_2$ first uses the filter program to compute the candidate map $m_F$. The second associative program $A_2$ then alters each input coordinate in the candidate map $m_F$ by applying a relative function that computes the coordinate in the same column, but in row one (RELROW$_1$). The second associative program $A_2$ alters each output coordinate in the candidate map $m_F$ by applying a relative function RELCOL$_2$, where RELCOL$_2$ is defined analogously to RELCOL$_1$. The resulting map $m_{A2}$ maps coordinates in row one of the input table 302 to coordinates of cells to be produced in column 2 of the output table 304 as shown below:

$$m_{A2} = \left\{ \begin{array}{c} ((1,2),(1,2)), ((1,3),(2,2)), ((1,4),(3,2)), \\ ((1,2),(4,2)), ((1,4),(5,2)), \\ ((1,3),(6,2)), ((1,4),(7,2)) \end{array} \right\}$$

Accordingly, the table transform program 112 in this example can be built from the filter program 418 and two associative programs, wherein the filter program 418 is utilized to build such associative programs. Specifically, a first associative program can be built by combining the filter program 418 (F) and relative functions $RELCOL_1$ to build the associative program (F, $RELCOL_1$, $RELCOL_1$). This associate program is consistent with the example input and output table 302 and 304, so the program generator component 110 can retain this associate program as a component program. Similarly, the program generator component 110 can find the second associative function by combining the filter program 418 and the relative functions $RELROW_1$ and $RELCOL_2$ to build the associate program (F, $RELROW_1$, $RELCOL_2$). This associative program is also consistent with the exemplary input and output tables 302 and 304, such that the second associative program can be retained as a component program.

The program generator component 110 can build other associative programs such as the ones described above. However, the program generator component 110 can determine that such associative programs are not consistent with the exemplary input and output tables 302 and 304, and thus does not retain them as component programs.

Now described is an exemplary language that can be utilized in connection with generating the table transform program 112. The syntax of such language will first be described, and thereafter the semantics of a program in such language can be described as a function from an input table to an output table.

The syntax below presents an exemplary formal syntax of a language that can be utilized to generate the table transform program 112:

---

TableProg := TABPROG(CompProg$_1$,...,CompProg$_n$)
CompProg := FilterProg | AssocProg
FilterProg := FILTER(MapCond, SEQ$_{i,j,k}$)
MapCond := AND(MapPred$_1$, MapPred$_2$,...,MapPred$_n$)
MapPred := ROWEQ(TERM$_1$, TERM$_2$) | COLEQ(TERM$_1$, TERM$_2$)
 | DATAEQ(TERM$_1$, TERM$_2$) | NOT(MapPred)
AssocProg := ASSOC(CompProg, RelFunc$_1$, RelFunc$_2$)
RelFunc := RELCOL$_i$ | RELROW$_i$

---

A table program (TableProg) is a set of component programs (CompProg). A component program is either a filter program (FilterProg) or an associative program (AssocProg). A filter program makes a single pass over an input table. During the pass the filter program selects certain cells from the input table and maps them to a substructure of the output table. This is reflected in the syntax of a filter program as follows: a filter program consists of a mapping condition over states of a filter program (MapCond) and an output coordinate sequencer (SEQ$_{i,j,k}$). The mapping condition selects which input coordinates are mapped to the output table and the output coordinate sequencer defines the output coordinate to which a selected input cell maps. A mapping condition is a conjunction of cell predicates (MapPred). Each cell predicate is an equality or disequality predicate over cell terms. Specifically, a cell predicate is an equality predicate either over the row, column or data in cell TERM's. A cell TERM is either a variable bound to a particular cell (such as the input cell being checked by the filter program) or a constant cell value.

An associative program AssocProg is built from a component program CompProg and two relative functions RelFunc$_1$ and RelFunc$_2$. A relative function can be RELCOL$_i$ or RELROW$_i$, where i is a fixed natural number.

Semantics of the exemplary language will now be described. Exemplary semantics can be defined in the list below:

$$[\![TABPROG(\{C_i\})]\!] = \lambda T_I \cdot \left\{ \begin{array}{l} (c_2, d) \mid (c_1, d) \in T_I, \\ (c_1, c_2) \in \bigcup_i \{[\![C_i]\!](T_I)\} \end{array} \right\}$$

$$[\![FILTER(G, S)]\!] = \lambda T_I \cdot FilterIter_{G,S}(InitState)$$

$$[\![AND(\{L_i\})]\!] = \lambda \sigma \cdot \bigwedge_{i=1}^{n} [\![P_i]\!](\sigma)$$

$$[\![ROWEQ(T_1, T_2)]\!] =$$

$$\lambda \sigma \cdot \left( \begin{array}{l} \left( \begin{array}{l} \lambda((r_1, c_2), d_1), ((r_2, c_2), d_2) \cdot \\ r_1 = r_2 \end{array} \right) \\ (\sigma(T_1), \sigma(T_2)) \end{array} \right)$$

$$[\![SEQ_{i,j,k}]\!] = \lambda(r, c) \cdot \left( \begin{array}{l} \text{if } r < i \text{ then } (i, j) \\ \text{else if } c < j \text{ then } (r, c + 1) \\ \text{else } (r + 1, j) \end{array} \right)$$

$$[\![ASSOC(C, R_1, R_2)]\!] = \lambda T_I \cdot \left\{ \begin{array}{l} ([\![R_1]\!](r_1, c_1), [\![R_2]\!](r_2, c_2)) \mid \\ ((r_1, c_1), (r_2, c_2)) \in [\![C]\!]T_I \end{array} \right\}$$

$$[\![RELCOL_i]\!] = \lambda(r, c) \cdot (r, i)$$

$$[\![RELROW_i]\!] = \lambda(r, c) \cdot (i, c)$$

$$FilterIter_{G,S}(\sigma) = \left( \begin{array}{l} \text{if } [\![G]\!](\sigma) \\ \text{then } \{(\sigma(CurIn), \sigma(CurOut))\} \text{ else } \emptyset \end{array} \right) \\ \bigcup \left( \begin{array}{l} \text{if } IsLastCell(\sigma(CurIn)) \text{ then } \emptyset \\ \text{else } FilterIter_{G,S}(IterUpdate_S(\sigma)) \end{array} \right)$$

$$IterUpdate_S(\sigma) = \sigma \left[ \begin{array}{l} CurIn \leftarrow NextInCoord(\sigma), \\ CurOut \leftarrow [\![S]\!](\sigma) \end{array} \right]$$

The semantics of the exemplary language described above can be defined by the semantic function [[..]] that interprets syntactic forms of the language as semantic values. The domain of semantic values can be defined as follows: a cell ((r,c),d) with r, c∈N can be an ordered pair built from a coordinate (r,c) and a data string d. A table T can be a set of cells, and a table program (a table transform program) P=TABPROG($\{C_i\}_i$) is a function from a table to a table. Each component program $C_i$ can be interpreted as a partial map from coordinates of cells in the input table to coordinates of cells that will be produced in the output table. For each cell ((r, c), d) in the input table with (r, c) being a coordinate in the domain of some map [[$C_i$]], P produces a cell ([[$C_i$]](r, c), d) in the output table.

Every component program is either a filter program or an associative program. A filter program FILTER(G,S) can be interpreted as a function that takes an input table and maps the coordinates of some of the cells in the input table to coordinate of cells to be produced in the output table. The filter program maps to output coordinates by checking each cell in the input table in a fixed order, such as row-major order. In the exemplary semantics above, this order is defined by a constant InitState that defines the coordinate of the first input cell (e.g., (0,0) in row major order), a predicate IsLastCell that decides if a coordinate is the last in the order, and a function NextInCoord from input coordinates to input coordinates that takes an input coordinate and computes the next coordinate in the order. As the filter program checks input cells, it maintains a state σ, which distinguishes certain key cells, such as the current input cell (CurIn) and the current output cell (CurOut), by binding the cells to corresponding variables. When the filter program checks each cell of the input table, it updates σ so that the variable CurIn points to the cell to be checked. The filter program then checks if σ satisfies the filter's mapping condition, G=AND($\{L_i\}_i$). A state σ satisfies G if and only if σ satisfiers every literal $L_i$. The semantics of each literal is standard—the above exemplary semantics gives the semantics of the predicate ROWEQ($TERM_1$, $TERM_2$) as an example. Whether or not σ satisfies a predicate is decided by the values in σ of cell terms, such as the variables CurIn and CurOut. If σ satisfies the mapping condition G, then the filter program maps the current input coordinate, which is bound to CurIn, to the current output coordinate, which is bound to CurOut.

If the filter program maps the current input coordinate, it updates the coordinate of the current output cell according to the filter program's output sequencer S. Whenever an output sequencer S=$SEQ_{i,j,k}$ is applied, it updates the current output coordinate to be the next coordinate in the output table by row major order that is at or below row i and in between columns j and k. Because j and k are fixed, such a sequencer can be applied by a filter program to produce columns with an unbounded number of rows, but it cannot be applied to produce an unbounded number of columns.

Like a filter program, an associative program A=ASSOC (C, $R_1$, $R_2$) maps coordinates in the input table to coordinates of cells to be produced in the output table. Associative program A maps coordinates by first computing the map $m_C$ of its component program C. From $m_C$, A computes its own map by applying the relative function $R_1$ to each input coordinate in $m_C$, and by applying the relative function $R_2$ to each output coordinate in $m_C$. A relative function $RELCOL_i$ takes a coordinate and computes the coordinate in the same row, but in column i, where i is a fixed constant. A relative function $RELROW_i$ takes a coordinate and computes the coordinate in the same column, but in row i. In this way, an associative program A computes a coordinate map by altering the coordinate map of a component program C.

For purposes of explanation, a table transform program that can be utilized to transform the exemplary input table 302 to the exemplary output table 304 is shown below. In this example, CONSTCELLCOL(n) can be a cell at column n, CONSTCELLROW(n) can be a cell at row n, and CONSCELLDATA(d) can be a cell with data d. Accordingly, $$G = \text{AND} \begin{cases} \text{NOT}(ROWEQ(CURCELL, CONSTCELLCOL(1))), \\ \text{NOT}(COLEQ(CURCELL, CONSTCELLROW(1))), \\ \text{NOT}(DATAEQ(CURCELL, CONSTCELLDATA(''''))) \end{cases}$$

$$F = \text{FILTER}(G, SEQ_{1,3,3})$$

The table program is, then:

$$TABPROG \begin{pmatrix} F, ASSOC(F, RELCOL_1, RELCOL_1), \\ ASSOC(F, RELROW_0, RELCOL_2) \end{pmatrix}$$

Now described will be an exemplary algorithm that can be utilized to infer the table transform program 112 described above. The algorithm is presented here. It is to be understood that this algorithm is exemplary, and is not intended to limit the scope of the claims.

```
   Input: example input table T_I, example output table T_O,
   Output: TableProg program InferredProg, where
           InferredProg(T_I) = T_O, or unmapped output table.
   /* Step 1): collect filter programs.              */
1  for CandMap ∈ EnumCandMaps(T_I, T_O, CandRules) do
2      MapCond ← CondFromMap(CandMap, StatePreds) ;
3      OutCoordSeq ← SeqFromMap(CandMap, Seqs) ;
4      FilterProgram ← FILTER(MapCond, OutCoordSeq) ;
5      FilterPrograms ← AddDistMap(FilterPrograms,
       FilterProgram) ;
6  end
   /* Step 2): collect associative programs.         */
7  Comps ← ∅;
8  Worklist ← FilterPrograms ;
9  while NewComps ≠ ∅ do
10     CompProg ← Choose( Worklist) ;
11     Worklist ← Worklist \{CompProg} ;
12     for Rel_1, Rel_2 ∈ RelFuncs do
13         AssocPrg ← ASSOC(CompProg, Rel_1, Rel_2) ;
14         if IsConsistent(AssocPrg, T_I, T_O) and
           Map(AssocPrg) ∉ Maps( Comps ∪ Worklist) then
15             Worklist ← AddDistMap(Comps, AssocPrg) ;
16         end
17     end
18 end
19 if IsOnto(Maps(Comps)) then
20     return TABPROG(Comps) ;
21 else
22     return UnmappedOutput(Comps) ;
23 end
```

The above program can be referred to herein as ProgFromEx. ProgFromEx, given exemplary input and output tables, infers a TableProg program that satisfies the examples. This exemplary algorithm infers table transform programs from the "bottom-up", in that it collects a set of component programs that may be combined to form a table program. If ProgFromEx finds a set of component programs that form a table program that satisfies the example, then ProgFromEx returns the table program. If ProgFromEx cannot find such a table program, then ProgFromEx provides to the user the substructure of the output table to which no component program maps.

ProgFromEx, shown above, takes from a user an exemplary input table $T_I$ and an exemplary output table $T_O$. ProgFromEx also is defined over three fixed sets of objects: a set of CandRules of candidate-map rules, a set of Sequencers of output sequences, and a set RelativeFuncs of relative functions. These sets are fixed, perhaps configured by an expert user or administrator.

ProgFromEx can be configured to find a table program that satisfies the example in the 2 steps mentioned above: 1) ProgFromEx collects a set of filter programs that map to substructures of $T_O$ (lines 1-6 of the above algorithm). To find a set of such filter programs, ProgFromEx applies CollectFilters (line 1), which first collects a set of candidate maps over the exemplary tables by applying the candidate map rules CandRules. For each candidate map CandMap generated by CandRules, ProgFromEx attempts to infer a filter program that computes CandMap (lines 2-4). To infer such a filter program, ProgFromEx infers a mapping condition (line 2) and an output sequencer (line 3). To infer a mapping condition, ProgFromEx applies CondFromMap, which computes the states of a hypothetical filter program as it reads and potentially maps each cell in the exemplary input table. If in a given state a filter program reads a cell that is mapped by the candidate map, then this state can be referred to as a read state of the filter program. For a set of read states RS, CondFromMap can construct the following condition:

$$G = \text{AND}\left(\bigcap_{\sigma \in RS} \{l \mid p \in \textit{StatePreds}, l \in \{p, \text{NOT}(p)\}, l(\sigma)\}\right)$$

where $l(\sigma)$ denotes that the literal l is satisfied in $\sigma$. G is the strongest condition that is satisfied by all read states. CondFromMap then checks if any non-read state satisfies G. If so, then no conjunction of literals from StatePreds may act as a mapping condition from CandMap. If not, then G acts as a mapping condition for CandMap. For CandMap, ProgFromEx can relatively immediately infer an output coordinate sequencer (OutCoordSeq (line 3). ProgFromEx then combines the mapping condition MapCond and sequencer OutCoordSeq to build a filter program that computes CandMap (line 4).

In step 2) (lines 7-18), ProgFromEx uses the filter programs found in step 1) to build associative programs until ProgFromEx can use the set of filter and associative programs to build a table program that satisfies $T_1$ and $T_O$, or ProgFromEx determines that no such table program exists. ProgFromEx iteratively builds associative programs as follows: over each iteration of the loop at line 9, ProgFromEx maintains a worklist (Worklist) of component programs that it will use to build more associative programs, and a set of component programs (Comps) from which it has already built associative programs. At the beginning of the first iteration, Worklist is initialized to all of the filter programs found in step 1 (line 8), and Comps is initialized to be empty (line 7).

ProgFromEx executes an interation of step 2) as follows: first, ProgFromEx chooses an element CompProg from its worklist (line 10). ProgFromEx then builds associative programs from CompProg. An associative program comprises a component program and a pair of relative functions. Thus, to build associative programs from a component program CompProg, ProgFromEx enumeratesover all pairs of relative functions (line 12). For relative functions $\text{RelFunc}_1$ and $\text{RelFunc}_2$, ProgFromEx builds the corresponding associative program AssocProg (line 13). ProgFromEx then decides if AssocProg computes a map that is consistent for $T_1$ and To (line 14). If so, and if the map computed by AssocProg is not computed by any component program in Comps or Worklist, then ProgFromEx adds AssocProg to Worklist (line 15).

ProgFromEx iteratively builds associative programs until it determines that it has found a set of component programs that map to all cells in $T_O$ (e.g., a set that covers $T_O$), or that it can find no such set of component programs (line 9). To check if a set of component programs covers $T_O$, ProgFromEx checks if every coordinate c in $T_O$ is mapped to by some component program in the set. If ProgFromEx finds such a set, then it builds a table program from the set and returns the table program (line 20). Otherwise, it returns the set of output cells to which no component program maps (line 22). The user can examine the output cells to understand why ProgFromEx could not infer a program to satisfy the examples, perhaps finding errors or noise in the provided exemplary input table and output tables.

As can be understood by one of ordinary skill in the art, the program generator component 110 can execute the above algorithm or other suitable algorithm for transforming tables as described herein. In some instances the exemplary input and output tables provided by the user may include insufficient data to infer a table transform program as described herein. In an exemplary embodiment, the program generator component 110 can actively request or query the user about certain desires of the user to undertake during transformation. Based upon answers to these queries, the program generator component 110 can locate or infer the table transform program 112 that satisfies the requirements of the user.

In an alternative embodiment, the program generator component 110 can apply a lazy approach. In a lazy approach, the program generator component 110 can receive exemplary input and output tables from the user and infer a program that satisfies such examples. The user can then apply the inferred program to other inputs. If, on another input, the program produces an output that the user does not expect, then the user can provide the input table and expected output table to program generator component 110 as exemplary input and output tables, and the program generator component 110 can infer a new program that satisfies both the original and new examples. The user can repeat this process until the program generator component 110 provides a program that behaves as the user expects for the inputs on which they apply it. Unlike an approach based on acts of querying, the lazy approach does not guarantee that the program generator component 110 infers a program that is correct for all inputs. In practice, however, it has been observed that users do not need to apply table transform programs to arbitrary input tables. Instead, users apply a table transform program to set up tables that all satisfy strong preconditions. Requiring users to specify program behavior for tables outside of this precondition is unnecessary and often causes users to refuse to use such technology.

Two extensions of the program generator component 110 will now be described. If a user applies the system 100 to exemplary input and output tables, obtains the program, and finds that the program behaves incorrectly on a different input table, the user can provide an additional input table along with a corresponding correct output table as another example for the program generator component 110. The program generator component 110 can then generate a new table transform program that better satisfies the requirements of the user. If the second input table extends the first input table, then the user may apply the program generator component 110 solely to the second input table. Even if, however, the exemplary input tables are incomparable, the program generator component 110 can be extended to take multiple examples from a user simultaneously. To take multiple examples, the program generator component 110, as embodied in the algorithm shown above, is extended to locate filter programs and associative programs that are consistent for a set of multiple examples. To find filter programs that are consistent for all examples, the loop at lines 1-6 can be changed to enumerate over the space of all tuples, including a candidate map for each example. For each tuple of candidate maps, the program generator component 110 can attempt to infer a map condition that classifies exactly the cells mapped by each candidate map, and an output coordinate sequencer that describes a sequence of output cells that are mapped to in each candidate map. To find an associative program that is consistent for all examples, the check at line 14 of the above algorithm can be extended to determine if the associative program is consistent with each example. Finally the checks at lines 9 and 19 can be extended so that the program generator component 110 determines that it has found a satisfying table program only when it finds a collection of component programs that map to every cell in all exemplary output tables provided by the user.

The program generator component 110 can also be extended so that it infers a program from a single example that is, in practice, more likely to behave as expected when applied to other tables. Step two of the algorithm above can halt when ProgFromEx finds a set of component programs that map to every cell in the exemplary output table. However, the resulting set may include multiple component programs that are redundant, as a smaller set of programs would still map to the same cells. In practice, the more component programs that form a table program, the more likely table programs are to behave incorrectly when applied to other tables. Thus, ProgFromEx can be extended so that at line 20 such algorithm does not necessarily build a table transform program from all component programs that it finds. Instead, ProgFromEx can first apply a greedy algorithm to prune the set of all component programs found in a set that still maps to all cells in the exemplary output table but is locally minimal. The resulting program is intuitively simpler than the original program, and in practice more behaves as expected on larger input examples.

Figure 6:
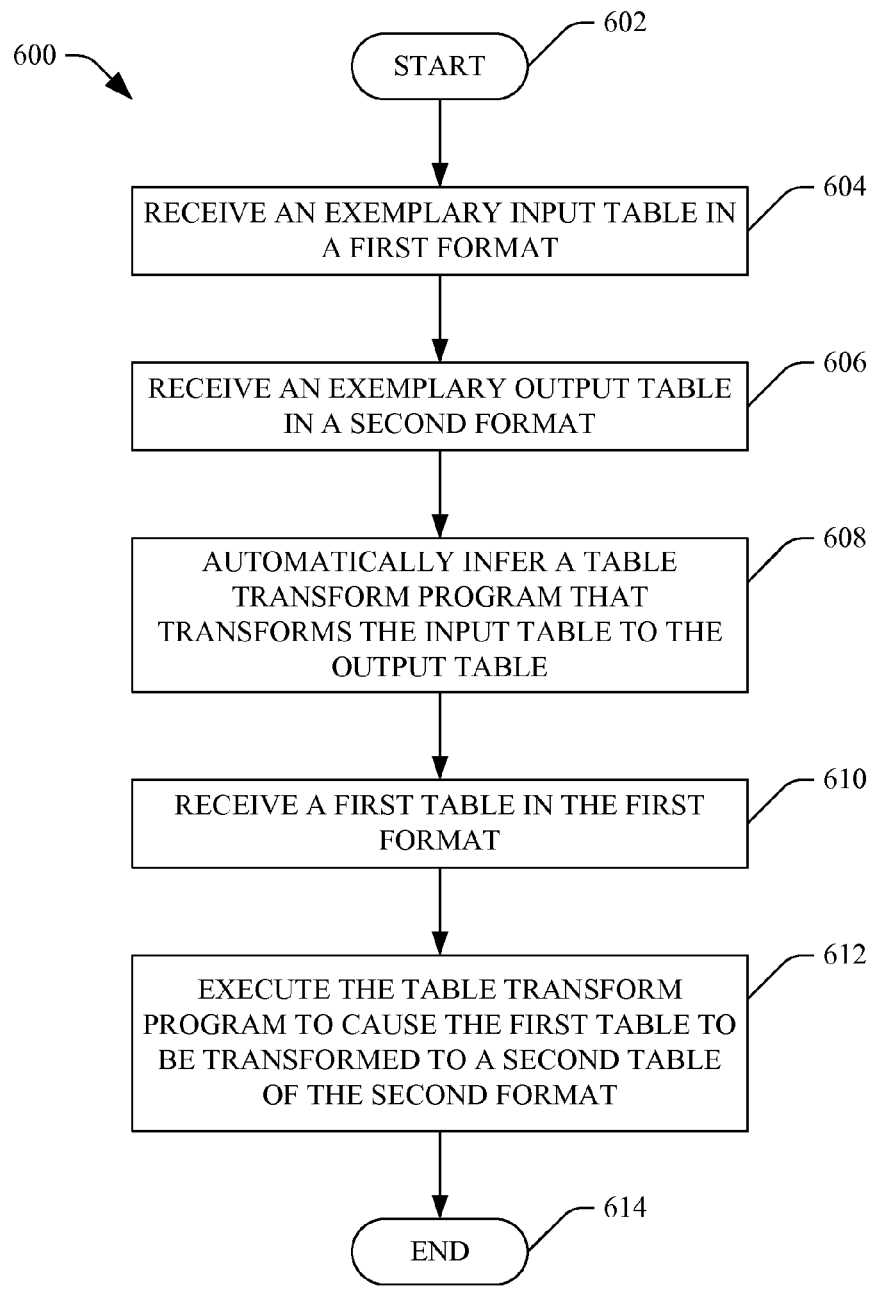
FIG. 6 is a flow diagram illustrating an exemplary methodology for executing a table program to transform a first table in a first format to a second table in a second format.
Figure 7:
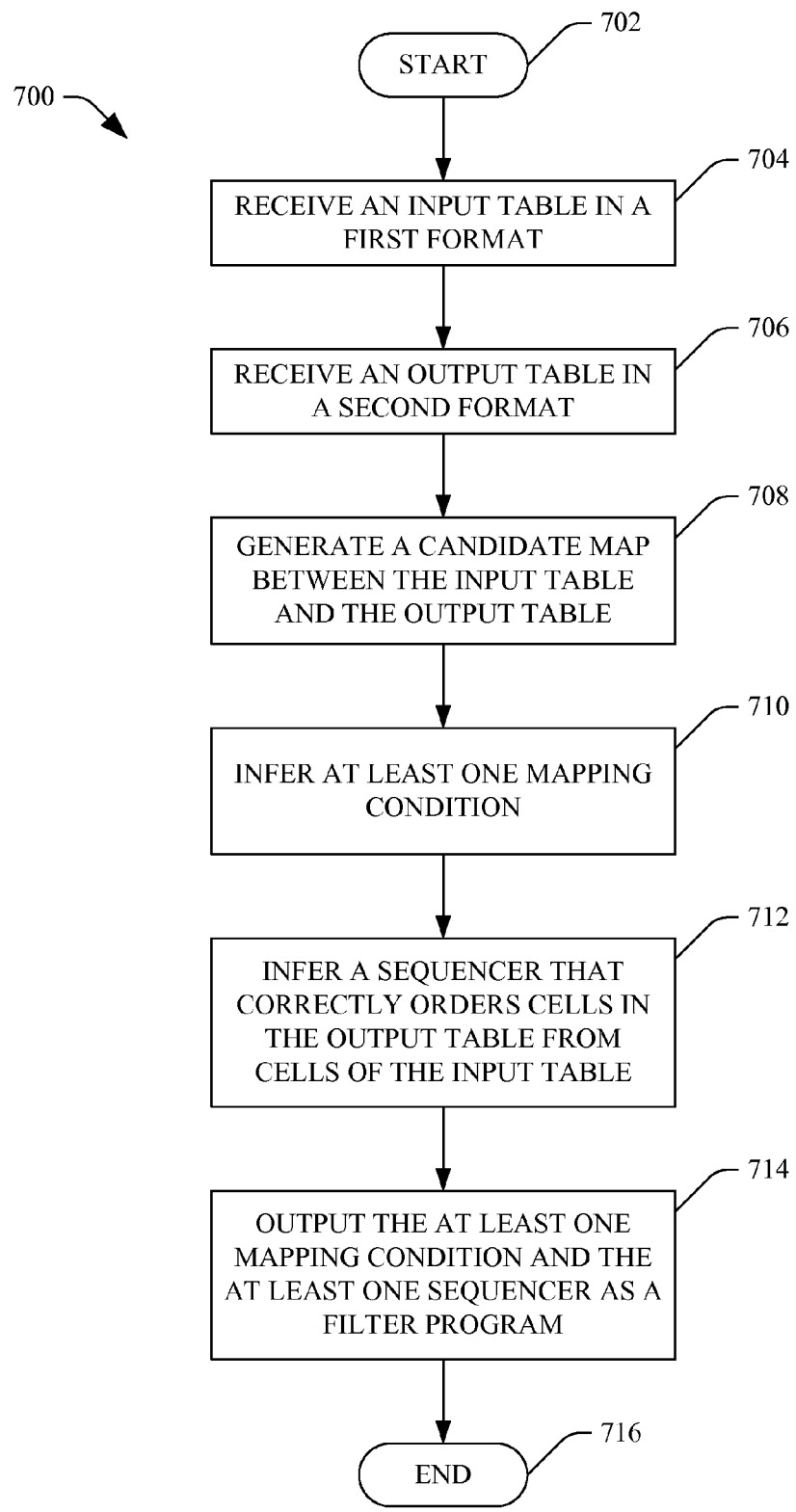
FIG. 7 is a flow diagram that illustrates an exemplary methodology for generating a filter program that can be utilized in connection with transforming a first table in a first format to a second table in a second format.
Figure 8:
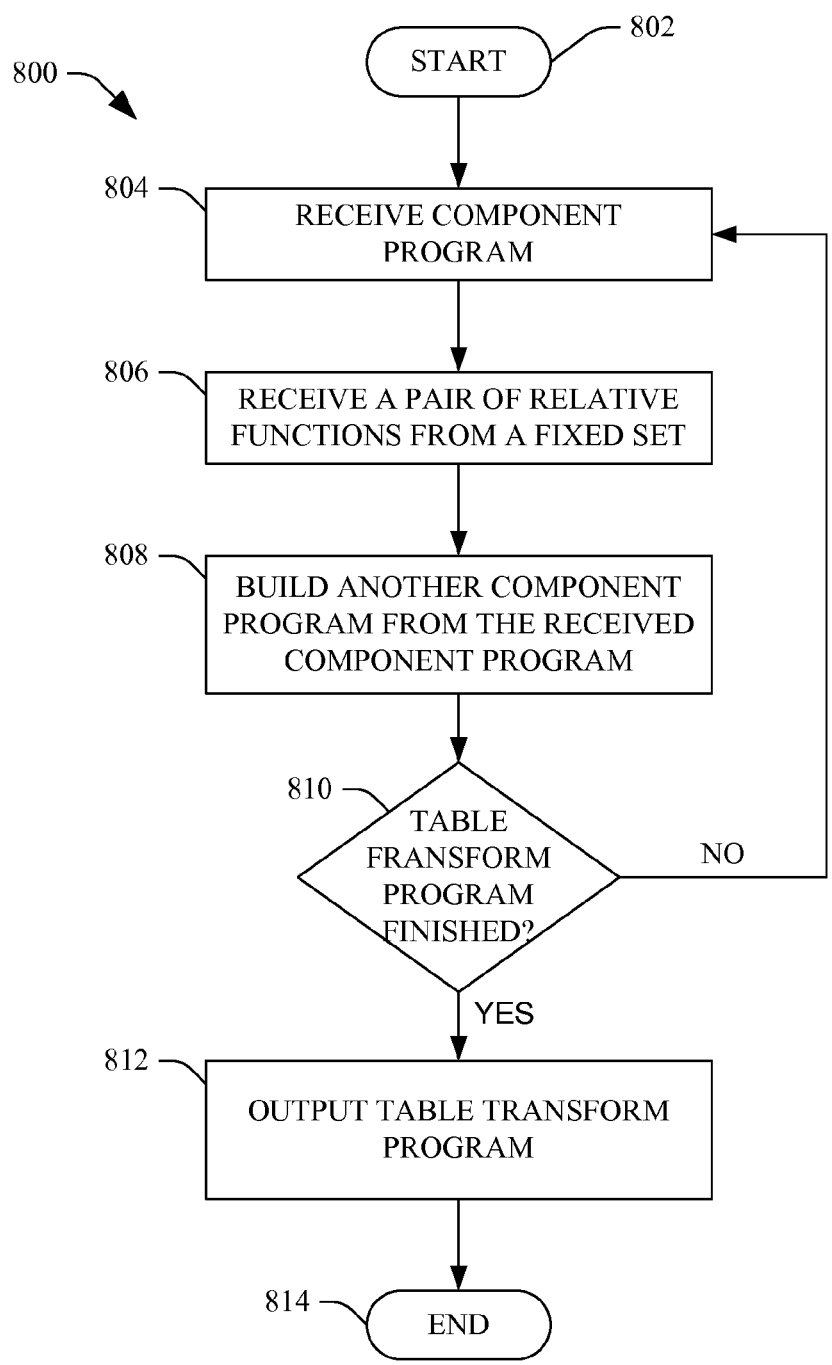
FIG. 8 is a flow diagram that illustrates an exemplary methodology for generating a computer executable program that can transform a first table in a first format to a second table in a second format.

Referring now to FIGS. 6-8, various exemplary methodologies are illustrated and described. While the methodologies are described as being a series of acts that are performed in sequence, it is be understood that the methodologies are not limited by the order of the sequence. For instance, some acts may occur in a different order than what is described herein. In addition, an act may occur concurrently with another act. Furthermore, in some instances not all acts may be required to implement a methodology described herein.

Moreover, the acts described herein may be computer-executable instructions that can be implemented by one or more processors and/or stored in a computer readable medium or media. Computer executable instructions may include a routine, a subroutine, programs, a thread of execution and/or the like. Still further, results of acts of the methodologies may be stored in a computer readable medium, displayed on a display device, and/or the like. The computer readable medium may be a non-transitory medium such as memory hard drive, CD, DVD, flash drive, and/or the like.

Referring now to FIG. 6, a methodology 600 that facilitates generation of a table transform program is illustrated. The methodology 600 starts at 602, and at 604, an exemplary input table is received in a first format. The input table can be received at a computing device, and the input table can include at least one row and at least one column.

At 606, an exemplary output table is received in a second format at the computing device. The second format is non-identical to the first format, and the exemplary output table includes at least one row in at least one column.

At 608, a table transform program is automatically inferred, wherein the table transform program transforms the input table to the output table. The table transform program is inferred based at least in part upon the format of the input table and the format of the output table. Furthermore, the table transform program is a computer executable algorithm that, when executed over the input table, generates the output table.

At 610 a first table is received in the first format. For example, the input table may be a portion of the first table such that the first table is substantially larger than the input table. At 612, the table transform program automatically inferred at 608 is executed over the first table to cause the first table to be transformed to a second table that is of the second format. Accordingly, as can be discerned from the above, a user can provide an example input table and an example output table and can thereafter cause another table that is of the same format as the example input table to be transformed to another table that is of the same format as the exemplary output table provided by the user. The methodology 600 completes at 614.

Referring now to FIG. 7, an exemplary methodology 700 that facilitates outputting at least one mapping condition and a sequencer to generate a filter program is illustrated. The methodology 700 starts at 702, and at 704 an input table is received from a user in a first format as described above. This input table may be a portion of a first table that is to be desirably transformed from a first format to a second format.

At 706, an output table is received in the second format. Again, this can be an exemplary table that corresponds to the input table.

At 708, a candidate map is generated between the input table and the output table, wherein the candidate map is generated based at least in part upon one or more candidate map rules applied to the input table in view of contents of the output table. These candidate map rules can be selected from a predefined set of candidate map rules, and a candidate map is consistent in which at least a portion of the input table is mapped to a portion of the output table by way of the candidate map.

At 710, at least one mapping condition is inferred based at least in part upon the candidate map. As described above, the at least one mapping condition can be selected from a predefined set of atomic predicates, such that when the mapping condition is applied to a coordinate in the input table, such mapping condition causes that coordinate to be selected if and only if it is present in the candidate map.

At 712, a sequencer is inferred that correctly orders cells in the output table from cells of the input table. The sequencer can be inferred from amongst a set of predefined sequencers.

At 714, the at least one mapping condition and the at least one sequencer are output as a filter program. The methodology 700 completes at 716.

Now turning to FIG. 8, an exemplary methodology 800 that facilitates building a table transform program is illustrated. The methodology 800 starts at 802, and at 804 a component program is received. The component program can be a filter program and/or an associative program. Thus, a component program can be built based upon other previously built component programs.

At 806, a pair of relative functions from a fixed set of relative functions is received. These relative functions can be applied together with the received component program to generate a new map between at least a portion of the input table and at least a portion of the output table. At 808, another component program is built based at least in part upon the component program received at 804 and the pair of relative functions received at 806. At 810, a determination is made regarding whether the table transform program is complete. That is, a determination is made regarding whether the set of all component programs built up to now, when applied to the input table, create the output table. If the table transform program is not complete, then the methodology returns to 804 where another component program is received (e.g., for instance the component program built at 808). If the table program is complete, the methodology proceeds to 812 where the table transform program is output. The table transform program can be executed over a table of the same format as the exemplary input table. The methodology 800 completes at 814.

Figure 9:
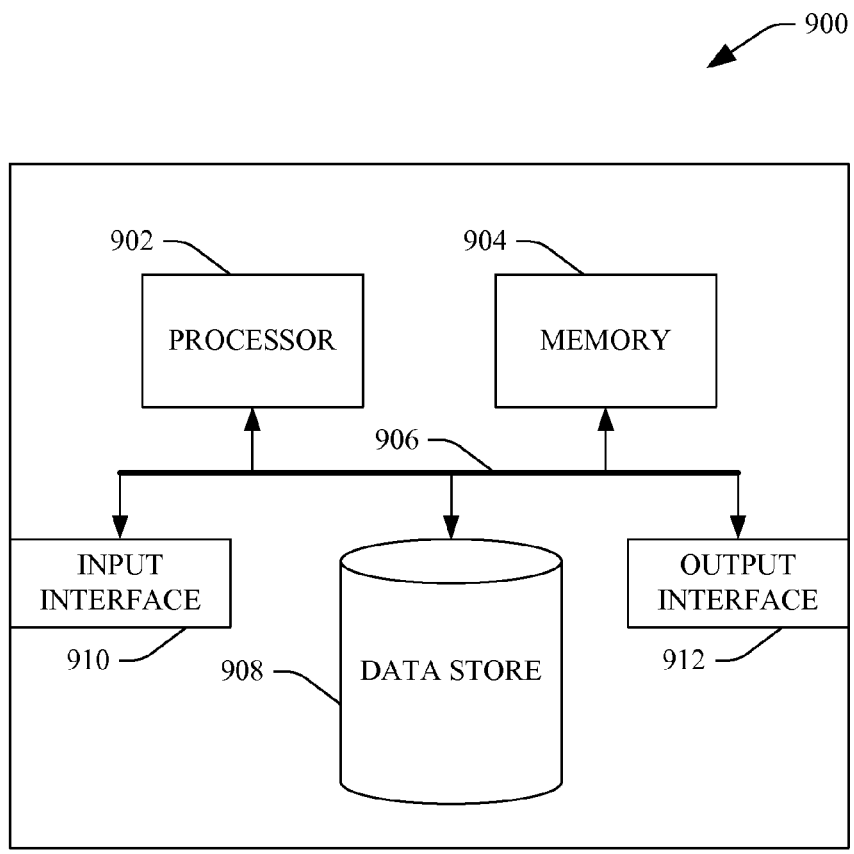
FIG. 9 is an exemplary computing system.

Now referring to FIG. 9, a high-level illustration of an exemplary computing device 900 that can be used in accordance with the systems and methodologies disclosed herein is illustrated. For instance, the computing device 900 may be used in a system that supports inferring a table transform program that is based at least in part upon examples provided by a user. In another example, the computing device 900 may be used in a system that supports retaining such a table transform program as a template. The computing device 900 includes at least one processor 902 that executes instructions that are stored in memory 904. The memory 904 may be or include RAM, ROM, EEPROM, flash memory or other suitable memory. The instructions may be, for instance, instructions for implementing functionality described as being carried out by one or more components discussed above or instructions for implementing one or more the methods described above. The processor 902 may access the memory 904 by way of a system bus 906. In addition to storing executable instructions, the memory 904 may also store tables, filter programs, associative programs etc.

The computing device 900 additionally includes a data store 908 that is accessible by the processor 902 by way of the system bus 906. The data store 908 may be or include any suitable computer readable storage including a hard disk, memory, etc. The data store 908 may be or include executable instructions, exemplary input tables, exemplary output tables, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces a computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
  receiving, at a computing device, an input table, wherein the input table comprises at least one row and at least one column, and wherein the input table has a first format;
  receiving, at the computing device, an output table, wherein the output table comprises at least one row and at least one column, and wherein the output table has a second format that is different from the first format;
  automatically inferring, based at least in part upon the first format of the input table and the second format of the output table, a computer-executable program that causes the input table to be transformed into the output table;
  receiving a first table that has the first format; and
  executing the computer-executable program over the first table, wherein executing the computer-executable program over the first table causes the first table to be transformed into a second table, wherein the second table has the second format.

2. The method of claim 1 being configured for execution in a computer-executable spreadsheet application.

3. The method of claim 1, wherein the input table is a portion of the first table, and the output table is a portion of the second table.

4. The method of claim 1, wherein the input table is received from a computer-implemented word processing application, and wherein the input table is structured text that comprises delimiters that identify table cells, rows, and columns.

5. The method of claim 4, wherein the output table is received from a computer-implemented spreadsheet application, and wherein second table is output to the computer-implemented spreadsheet application.

6. The method of claim 1, wherein automatically inferring the computer-executable algorithm comprises:
  locating entries in the input table that have corresponding cells in the output table;
  generating a candidate map between a portion of the input table and a portion of the output table based at least in part upon the cells located in the input table that have corresponding cells in the output table, wherein the candidate map indicates cell locations in the input table that correspond to cell locations in the output table, and wherein the computer-executable algorithm is automatically inferred based at least in part upon the candidate map.

7. The method of claim 6, wherein generating the candidate map comprises:
  selecting one or more candidate-map rules from a plurality of predefined candidate map rules;
  applying the one or more candidate map rules to the input table to generate a map;
  comparing the map with the output table;
  discarding the one or more candidate map rules if the map fails to correspond to the portion of the output table; and
  storing the map generated by way of application of the one or more candidate map rules as the candidate map if the map corresponds to the portion of the output table.

8. The method of claim 7, wherein automatically inferring the computer-executable program further comprises inferring a computer-executable filter program that computes the candidate map when the computer-executable filter program is applied to the input table, wherein inferring the computer-executable filter program comprises:
  inferring a mapping condition, wherein the mapping condition is satisfied by every cell in the input table that is mapped by the candidate map and fails to be satisfied by every cell in the input table that fails to be mapped to the candidate map; and
  inferring a sequencer program, wherein the sequencer program orders coordinates mapped by way of the mapping condition in accordance with an appropriate order in the output table.

9. The method of claim 8, wherein inferring the mapping condition comprises computing a conjunction over a fixed set of predicates and their negations utilizing a greedy algorithm.

10. The method of claim 8, further comprising generating an associative program based at least in part upon the filter program, wherein the associative program is generated by applying two relative functions to the filter program from a fixed set of relative functions, wherein the first relative function causes coordinates of the input table to be mapped to coordinates of the input table, and the second relative function causes coordinates of the output table to be mapped to coordinates of the output table.

11. A system comprising:
a processor; and
a memory comprising a plurality of components that are executable by the processor, the plurality of components comprising:
   a receiver component that receives an input table and an output table, wherein the input table comprises a first plurality of cells that are arranged in first rows and first columns, wherein the input table has a first table format, wherein the output table comprises a second plurality of cells that are arranged in second rows and second columns, wherein the output table has a second table format; and
   a program generator component that automatically generates an algorithm that is executable by the processor that, when executed over a first table that has the first format, outputs a second table that has the second format.

12. The system of claim 11, wherein at least one of the input table or the output table is structured text, wherein delimiters of different types define cells, rows, and columns in the structured text.

13. The system of claim 11, wherein the receiver component receives at least one of the input table or the output table from a computer-implemented word processing application.

14. The system of claim 11, wherein the receiver component receives at least one of the input table or the output table from a computer-implemented spreadsheet application.

15. The system of claim 11, wherein the receiver component receives at least one of the input table or the output table from a database management system.

16. The system of claim 11, wherein the input table is a portion of the first table and the output table is a portion of the second table.

17. The system of claim 11, wherein the program generator component is configured to cause the synthesized program to be retained as a template in a data store, wherein the template when selected by a user causes another table in the first format to be transformed to another table in the second format.

18. The system of claim 11, wherein a computer-executable application that is accessible by way of an Internet browser comprises the receiver component and the program generator component.

19. A computer-readable data storage device comprising instructions that, when executed by a processor, cause the processor to perform acts comprising:
   receiving an input table from a user, wherein the input table has a first plurality of cells arranged in a first format, wherein the input table is a portion of a first table;
   receiving an output table from the user, wherein the output table has a second plurality of cells arranged in a second format;
   automatically inferring an algorithm that, when applied to the input table, causes the input table to be transformed to the output table; and
   executing the algorithm over the first table to generate a second table, wherein the second table is in the second format.

20. The computer-readable data storage device of claim 19, wherein a computer-implemented spreadsheet application performs the automatically inferring of the algorithm.

* * * * *

UNITED STATES PATENT AND TRADEMARK OFFICE
CERTIFICATE OF CORRECTION

PATENT NO. : 8,484,550 B2  
APPLICATION NO. : 13/014734  
DATED : July 9, 2013  
INVENTOR(S) : Gulwani et al.

Page 1 of 1

It is certified that error appears in the above-identified patent and that said Letters Patent is hereby corrected as shown below:

In the Specification,

In column 15, line 50, delete "To" and insert -- $T_o$ --, therefor.

Signed and Sealed this
Seventeenth Day of February, 2015

Michelle K. Lee
*Deputy Director of the United States Patent and Trademark Office*